(12) United States Patent
Aihara (10) Patent No.: US 7,248,943 B2
(45) Date of Patent: Jul. 24, 2007

(54) METHOD FOR JUDGING COMMUNICATION STATE IN A CONTROL SYSTEM OF LINKED JOINTS

(75) Inventor: Masaki Aihara, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 763 days.

(21) Appl. No.: 10/486,041

(22) PCT Filed: Mar. 28, 2002

(86) PCT No.: PCT/JP02/03043

§ 371 (c)(1),
(2), (4) Date: Feb. 6, 2004

(87) PCT Pub. No.: WO03/015996

PCT Pub. Date: Feb. 27, 2003

(65) Prior Publication Data

US 2004/0233607 A1   Nov. 25, 2004

(30) Foreign Application Priority Data

Sep. 8, 2001   (JP) ............................ 2001-242004

(51) Int. Cl.
*G06F 19/00* (2006.01)
(52) U.S. Cl. ...................... 700/245; 700/258; 700/259; 318/568.12; 318/568.2; 318/568.24; 901/1
(58) Field of Classification Search .................. 700/245
See application file for complete search history.

(56) References Cited

U.S. PATENT DOCUMENTS 7,145,306 B2 * 12/2006 Aihara et al. .......... 318/568.12

7,148,645 B2 * 12/2006 Kobashi et al. ........ 318/568.12

FOREIGN PATENT DOCUMENTS

| JP | 04-000946 | 1/1992 |
| JP | 05-300199 | 11/1993 |
| JP | 2001-239480 | 9/2001 |

OTHER PUBLICATIONS

Gao et al., The HIT/DLR dexterous hand: work in progress, IEEE, vol. 3, Sep. 14-19, 2003 pp. 3164-3168.*

* cited by examiner

*Primary Examiner*—Thomas Black
*Assistant Examiner*—McDieunel Marc
(74) *Attorney, Agent, or Firm*—Rankin, Hill, Porter & Clark, LLP (57) ABSTRACT

Provided is a method in which a communication state between a main control unit and each sub control unit can be judged to be normal or abnormal, in a condition where a noise may be generated from a drive system power line. This method includes a power supply step s4, a test communication step (see arrows (3) and (4)), and a judgment step s6. In the power supply step s4, power is supplied to first sub control units 2a from a drive system power source 6 while no power is supplied to actuators 7 from the power source 6. In the test communication step, communication of a test signal is performed between the main control unit 1 and each of the sub control units 2. In the judgment step s6, whether the communication state is normal or abnormal is judged based on the result of the communication of the test signal between the main control unit 1 and each of the sub control units 2.

16 Claims, 4 Drawing Sheets

FIG. 4

METHOD FOR JUDGING COMMUNICATION STATE IN A CONTROL SYSTEM OF LINKED JOINTS

TECHNICAL FIELD

The present invention relates to a method of judging a communication state in a control system for a set of linkages connected by a plurality of joints.

BACKGROUND ART

Known is a control system like one in a bipedal walking robot, for controlling actuators provided at hip joints, knee joints, and foot joints of its legs, shoulder joints, elbow joints and wrist joints of its arms, and the like.

In the control system, the actuators are driven and controlled based on a communication of a control signal between a main control unit and each sub control unit through a signal line. Further, from a viewpoint of appropriate drive and control, it is judged whether a state of the communication is normal or abnormal in the process described below, before driving the robot.

First of all, power is supplied to each of the sub control units from a control system power source through a control system power line. Next, an ID request signal is transmitted from the main control unit to each of the sub control units through a signal line. Each of the sub control units receives the ID request signal and then transmits an ID signal to the main control unit through the signal line as above. This ID signal corresponds to an ID which has been assigned to each of the sub control units in advance. Accordingly, the main control unit identifies which one of the sub control units corresponds to which one of the actuators.

Thereafter, a test signal is transmitted from the main control unit to each of the sub control units through the signal line. Each of the sub control units receives the test signal, inverts bits of the test signal, and then transmits this signal back to the main control unit as a response signal. Based on whether or not the response signal is a signal which is obtained by accurately inverting the bits of the previously transmitted test signal, the main control unit judges whether the communication state with each of the sub control units is normal or abnormal.

When the main control unit judges that the communication state with each of the sub control units is normal, power is supplied to each of the sub control units from a drive system power source through a drive system power line. Based on the communications of the control signals with the main control unit through the signal lines, the sub control units control power supply from the drive system power source to the actuators. Therefore, the actuators are driven and controlled, and the right and left legs and arms of the robot are thus driven, allowing the robot to realize a walking function and the like.

Meanwhile, from a viewpoint of ensuring easy movement of a joint area of the robot, the signal line and the power line are provided to be close to each other especially at a joint portion. In the vicinities of the hip joints and the shoulder joints in particular, the signal lines and the power lines extending to the knee joints and the elbow joints, which are respectively provided down from the hip and shoulder joints, are concentrated. Hence, the communication state which was normal before driving the robot may become abnormal after the robot is driven, owing to an influence of a noise generated from the close drive system power line. This may cause abnormal drive and control of the actuator.

However, in the aforementioned method, whether the communication state is normal or abnormal is judged while power is supplied neither to the sub control units nor to the actuators from the drive system power source. Thus, this method is not capable of eliminating a possibility that the communication state which was normal before driving the robot becomes abnormal after the robot is driven, thereby causing the abnormal drive and control of the actuator.

Thus, in the present invention, a problem to be solved is to provide a method in which communication between a main control unit and each sub control unit can be judged to be normal or abnormal, in a condition where a noise may be generated from the drive system power line.

DISCLOSURE OF THE INVENTION

The present invention is applied for a control system which includes: the main control unit for controlling drive of an entire set of linkages connected by a plurality of joints; a plurality of the sub control units communicatively connected to the main control unit through the signal lines which pass through one joint portion of the set of linkages; a drive system power source; and an actuator for driving the set of linkages about each of the joints by being supplied with power from the drive system power source through a drive system power line which passes through the one joint portion of the set of linkages. The sub control units include a first sub control unit which is provided in a midstream of the drive system power line and controls actuation of the actuator by controlling power supply from the drive system power source to the actuator based on communication with the main control unit through the signal line.

In the above control system, the signal line for connecting the main control unit and each of the sub control units, and the drive system power line for connecting the drive system power source and each of the actuators are provided through the one joint portion. Further, it may be required to provide the signal line and the power line to be close to each other in order to ensure easy movement of each of the joint portions including the one joint portion. Therefore, the signal line and the drive system power line are concentrated at each of the joint portions, especially at the one joint portion. Thus, it is highly likely that a signal passing through the signal line is affected by a noise generated from the drive system power line. Therefore, it is important to confirm whether or not there is a possibility that drive control of each of the actuators is directly or indirectly affected by the noise, prior to drive control of the set of linkages.

A method of judging a communication state of the present invention to resolve the above problem comprises: a power supply step of supplying power from the drive system power source to the first sub control unit in a case where the signal line and the power line are concentrated at each of the joint portions of the set of linkages, while the power supply from the drive system power source to the actuator is stopped; a test communication step of performing test communication between the main control unit and the sub control units while power is supplied from the drive system power source to the first sub control unit by performing the power supply step; and a judgment step of judging whether the communication state between the main control unit and each of the sub control units is normal or abnormal based on a result of the test communication between the main control unit and each of the sub control units which is performed in the test communication step.

According to the present invention, whether the communication state is normal or abnormal is judged based on the result of the communication of a test signal between the main control unit and each of the sub control units. A condition where this judgment is made is similar to that for drive control of the set of linkages in that the signal line and the power line are concentrated at each of the joint potions of the set of linkages and power is supplied to the sub control unit from the drive system power source and therefore a noise may be generated from the drive system power line. On the other hand, the condition where this judgment is made is different from that for drive control of the set of linkages in that power is not supplied to the actuators from the drive system power source and therefore the set of linkages is not driven. Accordingly, it is possible to judge whether or not there is a possibility that the noise generated from the drive system power line makes the communication state abnormal, while preventing a situation where the set of linkages is driven even though the communication state between the main control unit and each of the sub control units through the signal lines may be abnormal. Additionally, when the judgment result is obtained, which indicates that the communication state is abnormal, action can be taken such as that the set of linkages is not driven until the communication state is returned to normal. Here, "to supply power" means to apply a voltage to an unit or the like regardless of whether or not there is an electric current.

In the aforementioned method, it is preferred that the control system be provided with a sensor for detecting a drive state of the set of linkages, and the sub control units include a second sub control unit for transmitting a detection signal from the sensor to the main control unit through the signal line.

According to the present invention, when the detection signal from the sensor is affected by the noise generated from the drive system power line, a judgment can be made whether or not there is a possibility that the drive and control of the set of linkages is indirectly affected by the noise.

In the foregoing method, it is preferred that the control system be provided with a control system power source and a control system power line that passes through the one joint portion of the set of linkages and connects the control system power source and each of the sub control units, and each of the sub control units is enabled to communicate with the main control unit through the signal line by power supply from the control system power source.

In the above control system, not only the signal line and the drive system power line, but also the control system power line is provided through the one joint portion. Thus, the density of the respective lines is higher at the one joint portion. Therefore, it is even more important to confirm whether or not the drive and control of the set of linkages is affected by a noise generated from the control system power line in addition to the noise generated from the drive system power line, prior to drive and control of the set of linkages.

According to the present invention, it is possible to judge, under the above situation, whether or not there is a possibility that the noise generated from the drive system power line makes the communication state abnormal, while preventing a situation where the set of linkages is driven even though the communication state between the main control unit and each of the sub control units through the signal line may be abnormal.

In the foregoing method, it is preferred that an indication step of indicating a result of judgment in the judgment step be provided.

According to the present invention, a person who is informed of the indication whether the communication is normal or abnormal can be swiftly given an opportunity to take subsequent action based on the indication.

In the foregoing method, it is preferred that the plurality of joints of the set of linkages be joints of a legged mobile robot.

According to the present invention, it is possible to judge whether or not the noise generated from the power line makes the communication state between the main control unit and each of the sub control units abnormal, before driving the legged mobile robot which has the plurality of joints.

BEST MODE FOR CARRYING OUT THE INVENTION

An embodiment of a method of judging a communication state of the present invention will be described with reference to the attached drawings.

The method is employed for a control system shown in FIG. 1, and the control system controls actuation of a bipedal-walking type legged mobile robot (hereinafter, referred to as "robot") shown in FIG. 2.

Figure 1:
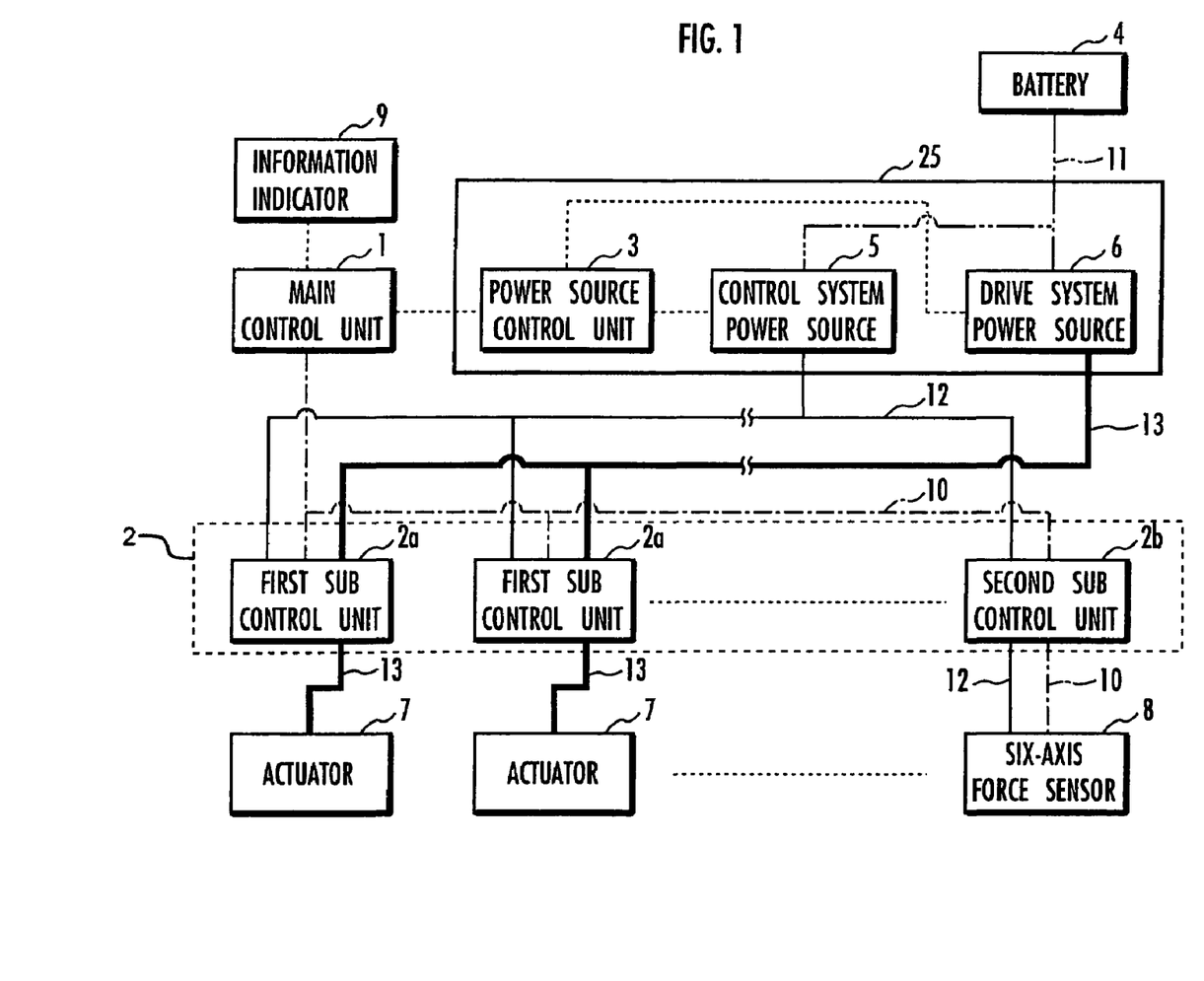
FIG. 1 is an explanatory diagram showing a construction of a control system for which a method of judging a communication state of an embodiment is employed.
Figure 2:
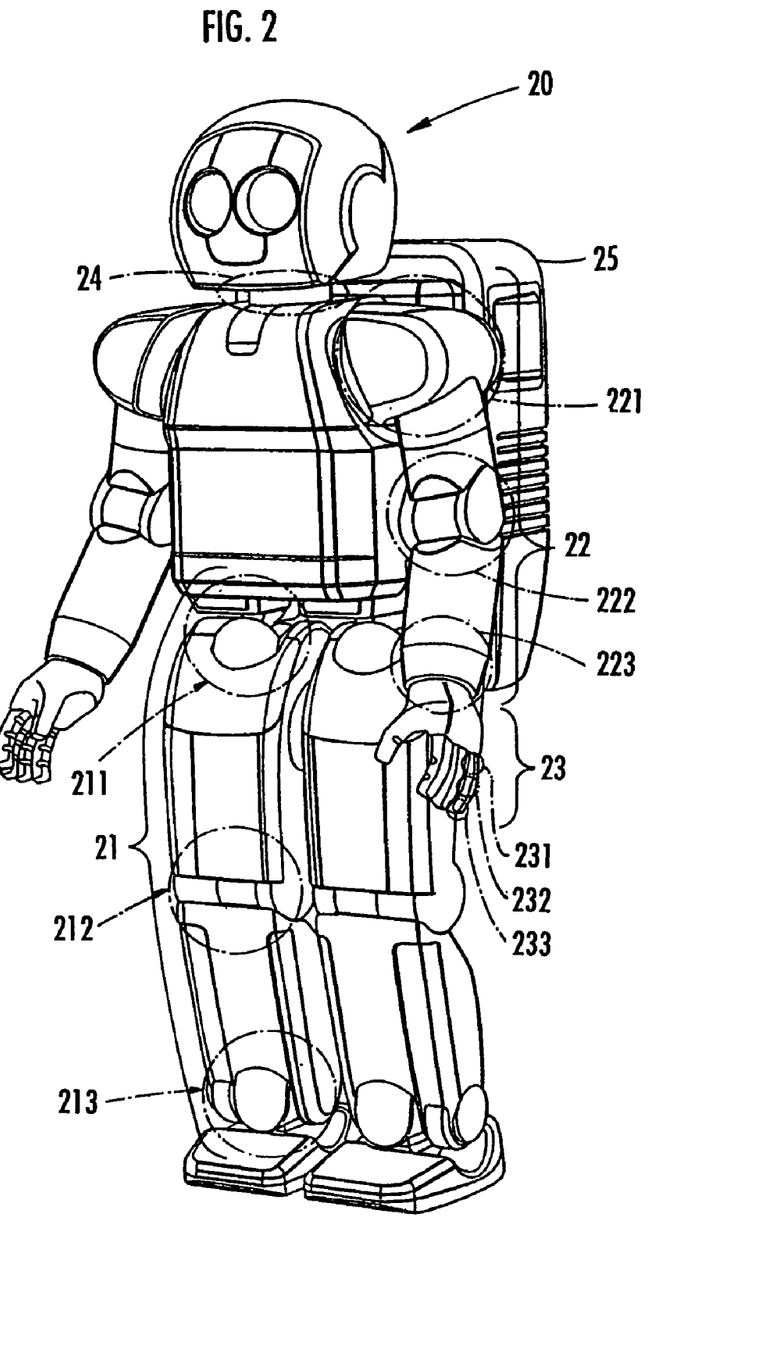
FIG. 2 is an explanatory view showing a construction of a robot controlled by the control system shown in FIG. 1.

The control system shown in FIG. 1 includes a main control unit 1, a plurality of sub control units 2, a power source control unit 3, a battery 4, a control system power source 5, a drive system power source 6, actuators 7, six-axis force sensors 8, and an information indicator 9.

The main control unit 1 and each of the sub control units 2 are communicatively connected through a signal line (chain line) 10. The battery 4 and each of the power sources 5 and 6 are connected through a power line (chain double-dashed line) 11. The control system power source 5 and each of the sub control units 2 are connected though a control system power line (thin line) 12. The drive system power source 6 and each first sub control unit 2a are connected through a drive system power line (thick line) 13. The first sub control units 2a and the actuators 7 are connected through the drive system power lines (thick lines) 13, respectively. The second sub control units 2b and the six-axis force sensors 8 are connected through the signal line (chain line) 10 and the control system power line (thin line) 12, respectively.

The main control unit 1 is configured by properly combining a CPU, an IC, a memory, a signal input circuit, a signal output circuit and the like, and controls actuation of the entire robot 20 through communications with the sub control units 2 though the signal lines 10, and the like.

Each of the sub control units 2 is configured by properly combining a CPU, an IC, a memory, a signal input circuit, a signal output circuit and the like and classified as the first sub control unit 2a or the second sub control unit 2b. The first sub control unit 2a is provided at each joint portion 211 to 213, 221 to 223, 231 to 233 and 24 of the robot 20, and controls actuation of each of the actuators 7 based on a communication with the main control unit 1 through the signal line 10. The second sub control unit 2b is provided at each of the foot joint portions 213 of the robot and transmits a measurement signal from the six-axis force sensors 8 to the main control unit 1 through the signal line 10.

The power source control unit 3 is configured by properly combining a CPU, an IC, a memory, a signal input circuit, a signal output circuit and the like. The power source control unit 3 is stored in a backpack portion 25 and controls power supplies from each of the power sources 5 and 6 to the sub control units 2.

The battery 4 is configured by a Ni—Zn battery, a Ni—MH battery, a lithium ion battery or the like.

The control system power source 5 is contained in the backpack portion 25 and supplies power, which is input from the battery 4 through the power line (chain double-dashed line in FIG. 1) 11, to the sub control units 2 through the control system power lines (thin lines in FIG. 1) 12. The drive system power source 6 is also contained in the backpack portion 25, and supplies power, which is input from the battery 4 through the power line (chain double-dashed line in FIG. 1) 11, to the actuators 7 through the drive system power lines (thick lines in FIG. 1) 13 via the first sub control units 2a.

The actuators 7 are provided at hip joint portions 211, knee joint portions 212, and foot joint portions 213 of legs 21, shoulder joint portions 221, elbow joint portions 222, and wrist joint portions 223 of arms 22, three interphalangeal joint portions 231, 232 and 233 of fingers 23, and a neck joint portion 24 of the robot 20, respectively. Note that the actuators 7 may be provided at other joint portions provided at the waist and the like of the robot 20.

The six-axis force sensors 8 are provided at the foot joint portions 213 of the robot 20, respectively, and measure translational forces in three-axis directions that are perpendicular to each other and moments about the three axes of each of the foot joint portions 213.

The information indicator 9 is provided on the surface of the backpack portion 25 of the robot 20. As described later, the information indicator 9 displays a predetermined normal code when the communication state is judged to be normal by the main control unit 1, and displays a predetermined error code when the communication state is judged to be abnormal.

The signal line 10, the control system power line 12 and the drive system power line 13 to be connected to the actuator 7 and the sub control unit 2 that are provided at the hip joint portion 211, pass through the hip joint portion (one joint portion) 211 of the robot 20. In addition to these lines, the signal lines 10, the control system power lines 12 and the drive system power lines 13 to be connected to the actuators 7 and the sub control units 2 that are provided at the knee joint portion 212 and the foot joint portion 213, respectively, also pass through the hip joint portion (one joint portion) 211. Similarly, the signal line 10, the control system power line 12 and the drive system power line 13 to be connected to the actuator 7 and the sub control unit 2 provided at the shoulder joint portion 221, pass through the shoulder joint portion (one joint portion) 221 of the robot 20. In addition to these lines, the signal lines 10, the control system power lines 12 and the drive system power lines 13 to be connected to the actuators 7 and the sub control units 2 that are provided at the elbow joint portion 222, the wrist joint portion 223 and the interphalangeal joint portions 231 to 233, respectively, also pass through the shoulder joint portion (one joint portion) 221.

Moreover, the signal line 10, the control system power line 12, and the drive system power line 13 are provided close to each other in order to ensure easy movement of each of the joint portions 211 to 213, 221 to 223, 231 to 233 and 24. Therefore, the density of the signal line 10, the control system power line 12 and the drive system power line 13 is high at each of the joint portions 211 to 213, 221 to 223, 231 to 223 and 24, especially at the hip joint portion 211 and the shoulder joint portion 221.

Figure 3:
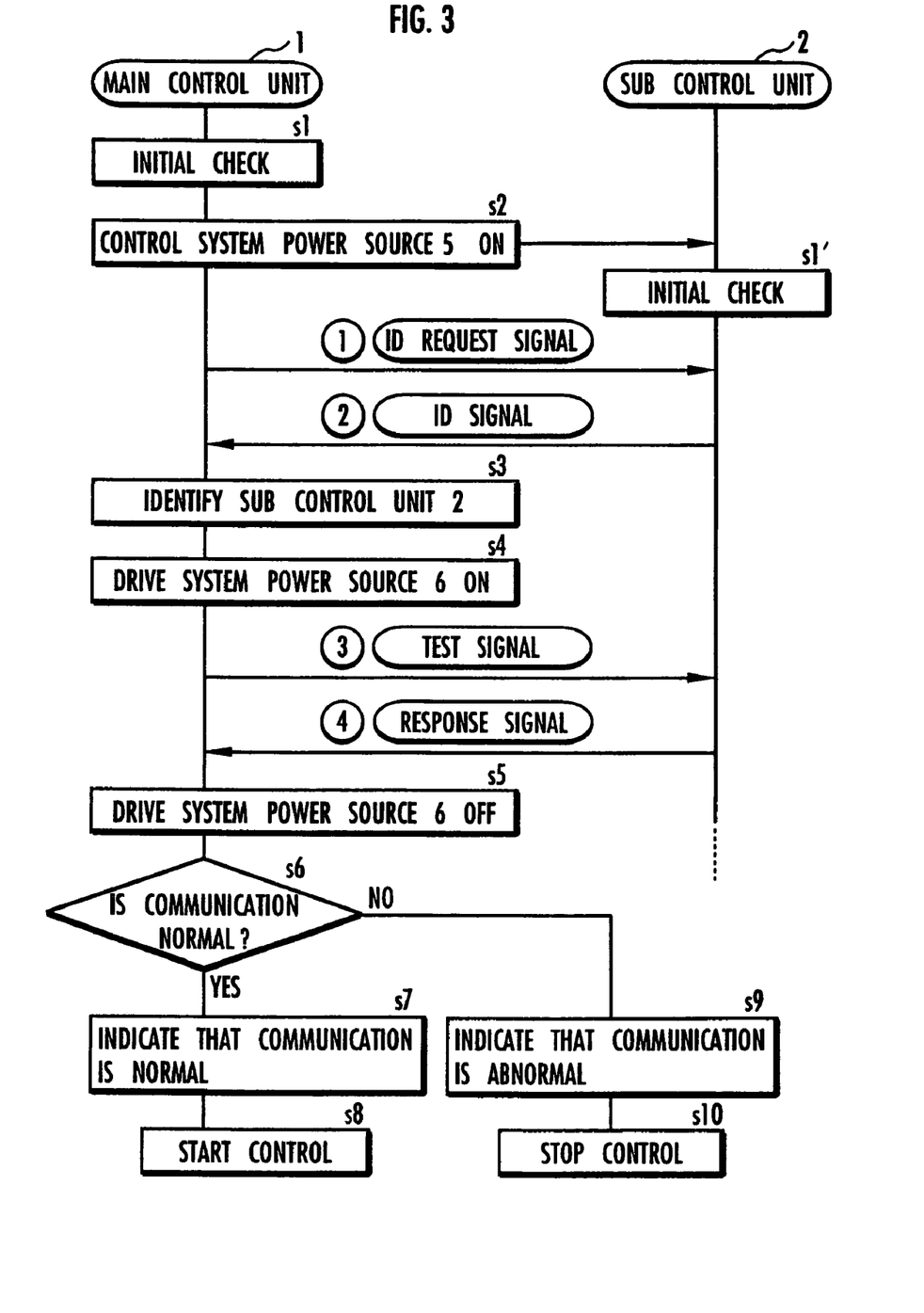
FIG. 3 is a flowchart showing the method of judging a communication state of the embodiment.

Next, the method of judging a communication state, which is employed for the control system having the above-described configuration, will be described by use of FIG. 3. In FIG. 3, the line on the left represents control related to the main control unit 1 and the line on the right represents control related to each of the sub control units 2.

First of all, the main control unit 1 performs an initial check of itself (s1). Specifically, the IC included in the main control unit 1 is initialized so that the main control unit 1 becomes ready to communicate extraneously.

After completion of the initial check, the main control unit 1 turns on the control system power source 5 through the power source control unit 3, allowing the control system power source 5 to supply power to the sub control units 2 (s2).

By being supplied with power from the control system power source 5, the sub control units 2 are enabled to realize functions thereof and perform the initial checks of themselves (s1'). Specifically, the IC included in each of the sub control units 2 is initialized similarly to the initial check (s1) of the main control unit 1, so that the sub control units 2 become ready to communicate extraneously.

Next, the main control unit 1 transmits an ID request signal to each of the sub control units 2 through the signal line 10 (arrow (1)). Further, each of the sub control units 2 receives the ID request signal and transmits an ID signal to the main control unit 1 through the signal line 10 (arrow (2)). The ID signal is related to an ID which has been assigned to each of the sub control units 2 in advance. Thereafter, based on the ID signal, the main control unit 1 identifies the sub control unit 2 which has transmitted the ID signal thereto (s3).

Subsequently, the main control unit 1 turns on the drive system power source 6 through the power source control unit 3, allowing the drive system power source 6 to supply power to the first sub control units 2a (s4: "power supply step" of this invention). At this time, the power supplies from the drive system power source 6 to the actuators 7 are blocked by the first sub control units 2a. In addition, the second sub control units 2b are not supplied with power from the drive system power source 6.

Under this condition, the main control unit 1 transmits a test signal to each of the sub control units 2 through the signal line 10 (arrow (3)). Each of the sub control units 2 then performs bit invert of the test signal and transmits this signal as a response signal to the main control unit 1 through the signal line 10 (arrow (4)). The main control unit 1 turns off the drive system power source 6 through the power source control unit 3 to stop power supplies from the drive system power source 6 to the first sub control units 2a (s5). Note that an exchange of the test signal and the response signal (arrows (3) and (4)) corresponds to a "test communication step" of this invention.

Based on whether or not the response signal (arrow 4)) is a signal which is obtained by accurately inverting the bits of the previously transmitted test signal (arrow 3)), the main control unit 1 judges whether or not the communication state with each of the sub control units 2 is normal (s6: "judgment step" of the present invention).

When the main control unit 1 judges that the communication state is normal (YES in s6), the main control unit 1 causes the information indicator 9 to display the predetermined normal code to indicate that the communication state is normal (s7: "indication step" of the present invention). Accordingly, drive and control of the robot 20 is started (s8). To be specific, first, through the power source control unit 3, the main control unit 1 causes the drive system power source 6 to supply power to the first sub control units 2a. Under this condition, control signals are transmitted/received between the main control unit 1 and each of the first subcontrol units 2a through the signal line 10. Further, the measurement signal generated by each of the six-axis sensors 8 is transmitted from each of the second sub control units 2b to the main control unit 1 through the signal line 10. Based on the measurement signal properly input from each of the second sub control units 2b, the main control unit 1 generates a control signal to be transmitted to each of the first control units 2a where appropriate. Thereafter, based on the communication of the control signal, each of the first sub control units 2a controls power supply from the drive system power source 6 to each of the actuators 7, and controls drive of each of the joint portions 211 to 213, 221 to 223, 231 to 233 and 24 for flexion and extension. Consequently, various functions such as a walking function of the robot 20 are realized.

On the other hand, when the main control unit 1 judges that the communication state is abnormal (NO in s6), the main control unit 1 causes the information indicator 9 to display the predetermined error code to indicate that the communication state is abnormal (s9: "indication step" of the present invention). Accordingly, drive and control of the robot 20 is stopped (s10).

As described earlier, the signal line 10, the control system power line 12 and the drive system power line 13 are concentrated at each of the joint portions 211 to 213, 221 to 223, 231 to 233 and 24, especially at the hip joint portion 211 and the shoulder joint portion 221. Therefore, it is highly likely that the control signal passing through the signal line 10 is affected by a noise generated from each of the power lines 12 and 13, at each of the joint portions 211 to 213, 221 to 223, 231 to 233 and 24, especially at the hip joint portion 211 and the shoulder joint portion 221.

Yet further, in general, when the robot 20 is walking, loads to the legs 21 are larger than those to the arms 22, the fingers 23 and the neck joint portion 24. Therefore, the actuators 9 at the joint portions 211 to 213 of the legs 21 are supplied with larger power than that supplied to the actuators 7 at the joint portions 221 to 223, 231 to 233 of the arms 22 and the fingers 23. Hence, it is highly likely that noises are generated from the drive system power lines 13 extending to the joint portions 211 to 213 of the legs 21, rather than from the drive system power lines 13 extending to the joint portions 221 to 223, 231 to 233 of the arms 22 and the fingers 23, as well as the neck joint portion 24. Meanwhile, appropriate drive and control of the legs 21 is essential for the robot 20 to walk.

Further, it is highly likely that the measurement signal from each of the six-axis sensors 8, which is provided at the ankle 213 of the robot 20, is affected by a noise at the hip joint portion 211 and the like where the density of the respective lines 10, 12 and 13 is high. Even if the control signal is not affected by the noise, if the measurement signal is affected by the noise, a control signal generated based on the measurement signal and thus actuation of the robot 20 become inappropriate.

In consideration of the above circumstances, it is important to confirm whether or not there is a possibility that drive and control of the actuators 7 is affected by the noise, prior to drive and control of the robot 20, and therefore the legs 21, the arms 22, the fingers 23 and the like.

In view of the circumstances, according to the present invention, whether the communication state is normal or abnormal is judged based on communication results of the test signal (see the arrow (3) of FIG. 3) and the response signal (see the arrow (4) of FIG. 3) between the main control unit 1 and each of the sub control units 2 (s6 of FIG. 3). A condition where this judgment is made is similar to that for drive and control of the legs 21 and the like of the robot 20 in that power is supplied to the first sub control units 2a from the drive system power source 6 and therefore a noise may be generated from the drive system power line 13. On the other hand, the condition where this judgment is made is different from that for drive and control of the legs 21 and the like of the robot 20 in that power is not supplied to the actuators 7 from the drive system power source 6 and therefore the robot 20 is not driven.

Accordingly, it is possible to judge whether or not there is a possibility that the noise generated from the drive system power line 13 makes the communication abnormal, while preventing a situation where the legs 21 and the like are driven even though the communication between the main control unit 1 and each of the sub control units 2 through the signal line 10 is abnormal.

Moreover, the judgment result is indicated by either the normal code or the error code displayed on the information indicator 9 of the robot 20 (see s7 and s9 in FIG. 3). Therefore, when the judgment result is obtained, which indicates that the communication state is abnormal, action can be taken such as that the robot 20 is not driven until the communication state is returned to normal.

Note that the "set of linkages" of the present invention is configured by the legs 21, the arms 22, the fingers 23 and the like of the robot 20 in this embodiment. However, the set of linkages may be various kinds of sets of linkages, such as an arm of a robot for making a precision instrument, which have joints driven for flexion and extension by actuators that are controlled by communications through signal lines and supplied with power through drive system power lines and control system power lines.

Figure 4:
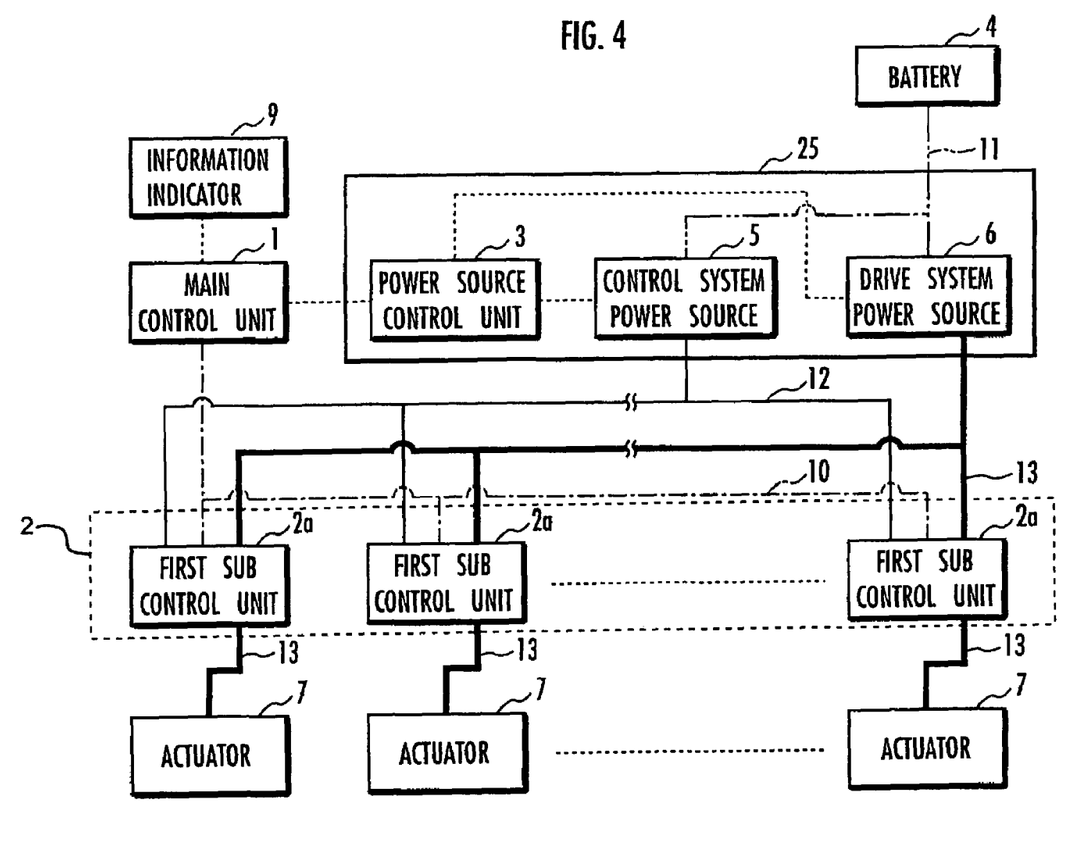
FIG. 4 is an explanatory diagram showing a construction of a control system for which a method of judging a communication state of another embodiment is employed.

In this embodiment, whether the communication state is normal or abnormal is judged in the control system in which the first sub control units 2a and the second sub control units 2b are present together as the sub control units 2 as shown in FIG. 1. However, as shown in FIG. 4 as another embodiment, the communication state may be judged to be normal or abnormal in a control system in which only the first sub control units 2a are included as the sub control units 2.

The invention claimed is:

1. A method of judging whether a communication state between a main control unit and a sub control unit through a signal line is normal or abnormal in a control system, which includes: the main control unit for controlling drive of an entire set of linkages connected by a plurality of joints; a plurality of the sub control units communicatively connected to the main control unit through the signal lines that pass through one joint portion of the set of linkages; a drive system power source; and an actuator for driving the set of linkages about each of the joints by being supplied with power from the drive system power source through a drive system power line that passes through the one joint portion of the set of linkages, wherein the sub control units include a first sub control unit that is provided in a midstream of the drive system power line and controls actuation of the actuator by controlling power supply from the drive system power source to the actuator based on communication with the main control unit through the signal line, the method comprising the steps of:
a power supply step of supplying power from the drive system power source to the first sub control unit in a case where the signal line and the power line are concentrated at each of the joint portions of the set of linkages, while the power supply from the drive system power source to the actuator is stopped;
a test communication step of performing test communication between the main control unit and the sub control units while power is supplied from the drive system power source to the first sub control unit by performing the power supply step; and
a judgment step of judging whether the communication state between the main control unit and each of the sub control units is normal or abnormal based on a result of the test communication between the main control unit and each of the sub control units which is performed in the test communication step.

2. The method according to claim 1,
wherein the control system is further provided with a sensor for detecting a drive state of the set of linkages, and
the sub control units include a second sub control unit for transmitting a detection signal from the sensor to the main control unit through the signal line.

3. The method according to claim 2,
wherein the control system is further provided with a control system power source and a control system power line that passes through the one joint portion of the set of linkages and connects the control system power source and each of the sub control units, and
each of the sub control units is enabled to communicate with the main control unit through the signal line by power supply from the control system power source.

4. The method according to claim 3, further comprising an indication step of indicating a result of judgment in the judgment step.

5. The method according to claim 4, wherein the plurality of joints of the set of linkages are joints of a legged mobile robot.

6. The method according to claim 3, wherein the plurality of joints of the set of linkages are joints of a legged mobile robot.

7. The method according to claim 2, further comprising an indication step of indicating a result of judgment in the judgment step.

8. The method according to claim 7, wherein the plurality of joints of the set of linkages are joints of a legged mobile robot.

9. The method according to claim 2, wherein the plurality of joints of the set of linkages are joints of a legged mobile robot.

10. The method according to claim 1,
wherein the control system is further provided with a control system power source and a control system power line that passes through the one joint portion of the set of linkages and connects the control system power source and each of the sub control units, and
each of the sub control units is enabled to communicate with the main control unit through the signal line power supply from the control system power source.

11. The method according to claim 10, further comprising an indication step of indicating a result of judgment in the judgment step.

12. The method according to claim 11, wherein the plurality of joints of the set of linkages are joints of a legged mobile robot.

13. The method according to claim 10, wherein the plurality of joints of the set of linkages are joints of a legged mobile robot.

14. The method according to claim 1, further comprising an indication step of indicating a result of judgment in the judgment step.

15. The method according to claim 14, wherein the plurality of joints of the set of linkages are joints of a legged mobile robot.

16. The method according to claim 1, wherein the plurality of joints of the set of linkages are joints of a legged mobile robot.

* * * * *

UNITED STATES PATENT AND TRADEMARK OFFICE
CERTIFICATE OF CORRECTION

PATENT NO. : 7,248,943 B2 Page 1 of 1
APPLICATION NO. : 10/486041
DATED : July 24, 2007
INVENTOR(S) : Aihara It is certified that error appears in the above-identified patent and that said Letters Patent is hereby corrected as shown below:

Column 10, Line 22, after "line" insert --by--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,248,943 B2  Page 1 of 1
APPLICATION NO. : 10/486041
DATED : July 24, 2007
INVENTOR(S) : Aihara It is certified that error appears in the above-identified patent and that said Letters Patent is hereby corrected as shown below:

On the Title Page, [Section 30], Foreign Application Priority Data, Line 1, delete "Sep. 8, 2001" and insert --August 9, 2001--.

Signed and Sealed this

Eighth Day of January, 2008

JON W. DUDAS
*Director of the United States Patent and Trademark Office*